(12) United States Patent
Inoue et al.

(10) Patent No.: US 11,448,565 B2
(45) Date of Patent: Sep. 20, 2022

(54) MEASUREMENT TIME DETERMINATION DEVICE, MEASUREMENT TIME DETERMINATION METHOD, AND COMPUTER-READABLE RECORDING MEDIUM

(71) Applicant: NEC Corporation, Tokyo (JP)

(72) Inventors: Hirofumi Inoue, Tokyo (JP); Katsumi Kikuchi, Tokyo (JP); Shigeki Shinoda, Tokyo (JP); Shin Tominaga, Tokyo (JP)

(73) Assignee: NEC CORPORATION, Tokyo (JP)

( * ) Notice: Subject to any disclaimer, the term of this patent is extended or adjusted under 35 U.S.C. 154(b) by 321 days.

(21) Appl. No.: 16/484,894

(22) PCT Filed: Mar. 1, 2018

(86) PCT No.: PCT/JP2018/007717
§ 371 (c)(1),
(2) Date: Aug. 9, 2019

(87) PCT Pub. No.: WO2018/159744
PCT Pub. Date: Sep. 7, 2018

(65) Prior Publication Data
US 2019/0368964 A1    Dec. 5, 2019

(30) Foreign Application Priority Data
Mar. 2, 2017 (JP) .............................. JP2017-039109

(51) Int. Cl.
*G01M 3/24* (2006.01)

(52) U.S. Cl.
CPC .................................. *G01M 3/243* (2013.01)

(58) Field of Classification Search
CPC ..................................................... G01M 3/243
See application file for complete search history.

(56) References Cited

U.S. PATENT DOCUMENTS 3,930,556 A * 1/1976 Kusuda ..................... G01H 3/12
73/40.5 A
2008/0144839 A1 6/2008 Yoshino et al.
(Continued)

FOREIGN PATENT DOCUMENTS

| JP | S55-71960 A | 5/1980 |
| JP | H01-276037 A | 11/1989 |

(Continued)

OTHER PUBLICATIONS

Fundamentals of Statistics <https://web.archive.org/web/20160815222328/http://www.statistics4u.com/fundstat_eng/cc_time_average.html> retrieved by Archive.org on Aug. 15, 2016. (Year: 2016).*

(Continued)

*Primary Examiner* — Michael J Dalbo
(74) *Attorney, Agent, or Firm* — Sughrue Mion, PLLC

(57) ABSTRACT

To reduce erroneous determinations of detecting a leak, a measurement time determination device is provided with: a degree-of-ease calculation unit configured to calculate degree-of-ease of detecting a leak in piping, based on vibration propagating through the piping or a fluid flowing through the piping when the piping is vibrated; and a determination unit configured to determine a measurement time necessary for detecting the leak, based on the degree-of-ease.

8 Claims, 13 Drawing Sheets

(56) References Cited

U.S. PATENT DOCUMENTS

| | | | |
|---|---|---|---|
| 2011/0183621 A1* | 7/2011 | Quan | H04L 27/0006 |
| | | | 455/67.11 |
| 2013/0049968 A1* | 2/2013 | Fleury, Jr. | H01Q 1/2291 |
| | | | 340/605 |
| 2014/0376910 A1* | 12/2014 | Kim | H04B 10/85 |
| | | | 398/28 |
| 2015/0241297 A1* | 8/2015 | Hoshuyama | E03B 7/003 |
| | | | 702/51 |
| 2018/0188104 A1 | 7/2018 | Arai et al. | |

FOREIGN PATENT DOCUMENTS

| | | |
|---|---|---|
| JP | 2005-265663 A | 9/2005 |
| KR | 101672136 B1 * | 11/2016 |
| WO | 2006/093152 A1 | 9/2006 |
| WO | 2015/141129 A1 | 9/2015 |
| WO | 2015/146082 A1 | 10/2015 |
| WO | 2016/208173 A1 | 12/2016 |

OTHER PUBLICATIONS

McKinnis, Peter Stephen, Interactin Between Main Line Standing Waves and Side Branch Resonance Frequencies (2007) < https://trace.tennessee.edu/cgi/viewcontent.cgi?article=2096&context=utk_chanhonoproj> retrieved on Jul. 9, 2021 (Year: 2007).*

Extended European Search Report for EP Application No. EP18761232.0 dated Mar. 4, 2020.

International Search Report for PCT Application No. PCT/JP2018/007717, dated May 15, 2018.

English translation of Written opinion for PCT Application No. PCT/JP2018/007717.

* cited by examiner

MEASUREMENT TIME DETERMINATION DEVICE, MEASUREMENT TIME DETERMINATION METHOD, AND COMPUTER-READABLE RECORDING MEDIUM

This application is a National Stage Entry of PCT/JP2018/007717 filed on Mar. 1, 2018, which claims priority from Japanese Patent Application 2017-039109 filed on Mar. 2, 2017, the contents of all of which are incorporated herein by reference, in their entirety.

TECHNICAL FIELD

The present invention relates to a measurement time determination device, a sensing device, a measurement time determination method, and a computer-readable recording medium.

BACKGROUND ART

Piping that transports water, oil, gas, and the like may be used longer than a service life. Deterioration of piping may cause a leak of a fluid flowing inside the piping, a rupture of the piping, and the like. Thus, a technique for performing sensing and the like of a leak by measuring vibration (hereinafter referred to as "leak vibration") generated due to the leak, and the like is considered.

PTL 1 describes a method of determining a leak position, and the like. The method described in PTL 1 extracts, by using a band-pass filter, leak vibration from a measurement value measured by a pair of vibration sensors and performs a cross-correlation function computation on the extracted pair of leak vibration.

CITATION LIST

Patent Literature

[PTL 1] Japanese Unexamined Patent Application Publication No. 2005-265663

SUMMARY OF INVENTION

Technical Problem

In the technique described in PTL 1, in piping installed in a place with loud noise, piping having a great installation interval between vibration sensors, and the like, a signal-to-noise ratio being a ratio of magnitude of vibration related to leak vibration to magnitude of noise may decrease. When the signal-to-noise ratio decreases, a long measurement time for vibration is needed for detecting a leak. Thus, the technique described in PTL 1 and the like require a technique for reducing a false judgment such as false negative in which it is judged as absence of a leak when the leak occurs, such as a technique of estimating a time necessary for detecting a leak.

The present invention is made in view of the above-mentioned problem, and a main object of the present invention is to provide a measurement time determination device and the like that reduce a false detection on leak detecting.

Solution to Problem

A measurement time determination device according to one aspect of the present invention includes a degree-of-ease calculation means for calculating degree-of-ease of detecting a leak in piping, based on vibration propagating through the piping or a fluid flowing through the piping when the piping is vibrated, and a determination means for determining a measurement time necessary for detecting the leak, based on the degree-of-ease.

A measurement time determination method according to one aspect of the present invention includes calculating degree-of-ease of detecting a leak in piping, based on vibration propagating through the piping or a fluid flowing through the piping when the piping is vibrated, and determining a measurement time necessary for detecting the leak, based on the degree-of-ease.

A computer-readable recording medium according to one aspect of the present invention non-temporarily stores a program causing a computer to execute processing of calculating degree-of-ease of detecting a leak in piping, based on vibration propagating through the piping or a fluid flowing through the piping when the piping is vibrated, and processing of determining a measurement time necessary for detecting the leak, based on the degree-of-ease.

Advantageous Effects of Invention

According to the present invention, a measurement time determination device and the like that reduce a false detection on leak detecting can be provided.

EXAMPLE EMBODIMENT

Figure 18:
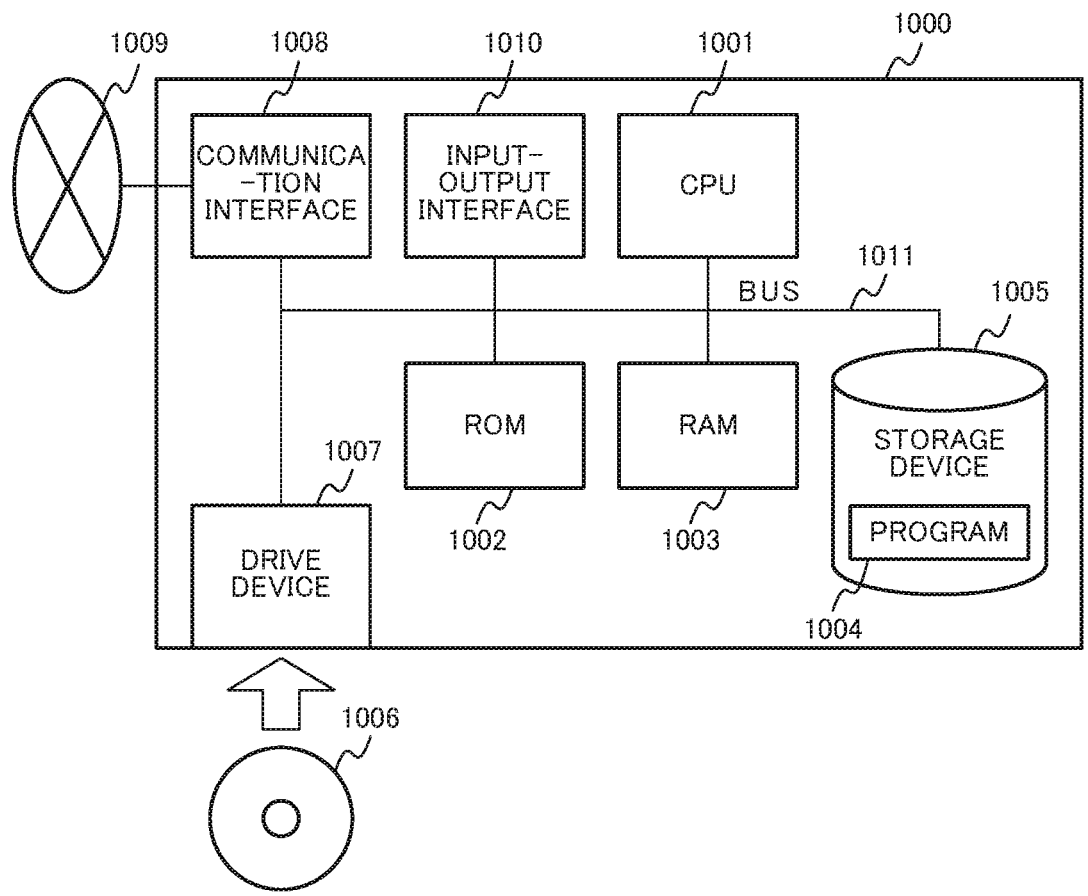
FIG. 18 is a diagram illustrating an example of an information processing device that achieves the measurement time determination device and the like in each of the example embodiments of the present invention.

Each of example embodiments of the present invention is described with reference to accompanying drawings. Each of components of each of devices represents a block of a functional unit in each of the example embodiments of the present invention. A part or the whole of each of the components of each of the devices is achieved by, for example, any combination of an information processing device 1000 as illustrated in FIG. 18 and a program. As one example, the information processing device 1000 includes configurations as follows.

A central processing unit (CPU) 1001
A read only memory (ROM) 1002
A random access memory (RAM) 1003
A program 1004 loaded into the RAM 1003
A storage device 1005 that stores the program 1004
A drive device 1007 that reads from and writes to a recording medium 1006
A communication interface 1008 connected to a communication network 1009
An input-output interface 1010 that inputs and outputs data
A bus 1011 that connects each component Each of the components of each of the devices in each of the example embodiments is achieved by the CPU 1001 acquiring and executing the program 1004 that achieves a function of each of the components. The program 1004 that achieves the function of each of the components of each of the devices is previously stored in the storage device 1005 and the RAM 1003, for example, and is read by the CPU 1001 as necessary. Note that the program 1004 may be supplied to the CPU 1001 via the communication network 1009, or may be previously stored in the recording medium 1006 and read and supplied to the CPU 1001 by the drive device 1007.

A method of achieving each of the devices has various modification examples. For example, each of the devices may be achieved by any combination of an information processing device 1000 and a program, which differs by each component. Alternatively, a plurality of components provided in each of the devices may be achieved by any combination of one information processing device 1000 and a program.

A part or the whole of each of the components of each of the devices is achieved by general-purpose or dedicated circuitry including a processor and the like, or achieved by a combination thereof. A part or the whole of each of the components of each of the devices may be formed by a single chip or formed by a plurality of chips connected to one another via a bus. A part or the whole of each of the components of each of the devices may be achieved by a combination of the above-described circuitry and the like and a program.

When a part or the whole of each of the components of each of the devices is achieved by a plurality of information processing devices, circuits, or the like, the plurality of information processing devices, circuits, or the like may be arranged in a concentrated manner or a distributed manner. For example, the information processing devices, the circuits, and the like may be achieved as a form in which each is connected via a communication network, such as a client and server system or a cloud computing system.

First Example Embodiment

Figure 1:
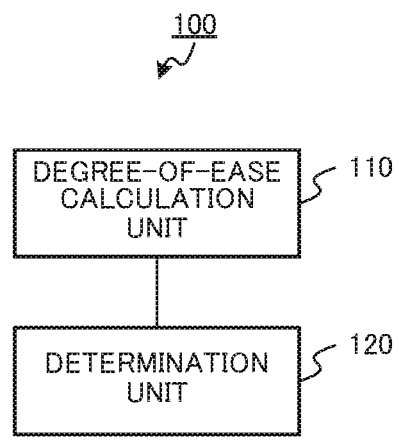
FIG. 1 is a diagram illustrating a configuration of a measurement time determination device in a first example embodiment of the present invention.

First, a first example embodiment of the present invention is described. FIG. 1 is a diagram illustrating a measurement time determination device in the first example embodiment of the present invention.

As illustrated in FIG. 1, a measurement time determination device 100 in the first example embodiment of the present invention includes a degree-of-ease calculation unit 110 and a determination unit 120. The degree-of-ease calculation unit 110 calculates degree-of-ease of detecting a leak in piping, based on vibration propagating through the piping or a fluid flowing through the piping when the piping is vibrated. The determination unit 120 determines a measurement time necessary for detecting a leak, based on the degree-of-ease.

Figure 2:
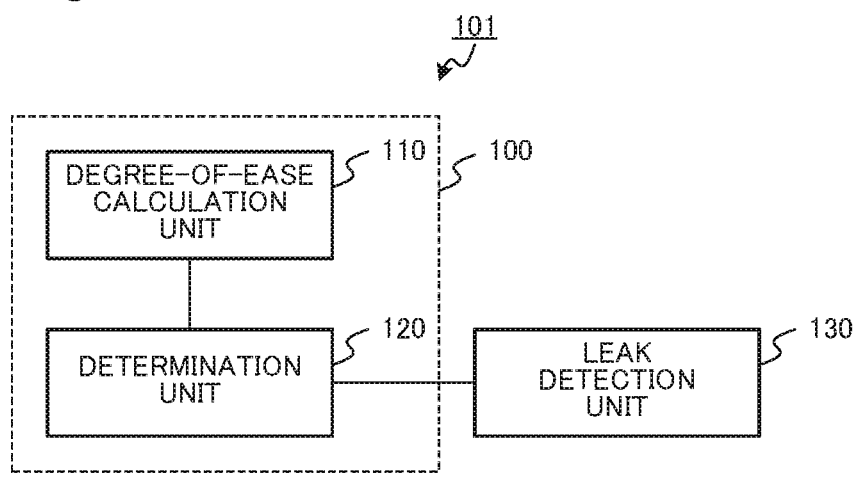
FIG. 2 is a diagram illustrating a configuration of a detection device in the first example embodiment of the present invention.

Further, as illustrated in FIG. 2, a detection device 101 including the measurement time determination device 100 is configured. The detection device 101 includes the measurement time determination device 100 described above and a leak detection unit 130. The leak detection unit 130 detects presence or absence of a leak in piping, based on vibration that propagates through the piping or a fluid flowing through the piping and is sensed by a measurement for a time determined according to a measurement time determined by the measurement time determination device 100. Note that the measurement time when the leak detection unit 130 detects presence or absence of a leak is determined in such a way as to have a length longer than or equal to the measurement time determined by the measurement time determination device 100.

Further, it is assumed in the present example embodiment that the leak detection unit 130 determines a position in which a leak occurs. When the leak detection unit 130 detects a position in which a leak occurs, for example, a correlation method of detecting a position, based on an arrival time difference of vibrations measured at two places, is used.

Figure 3:
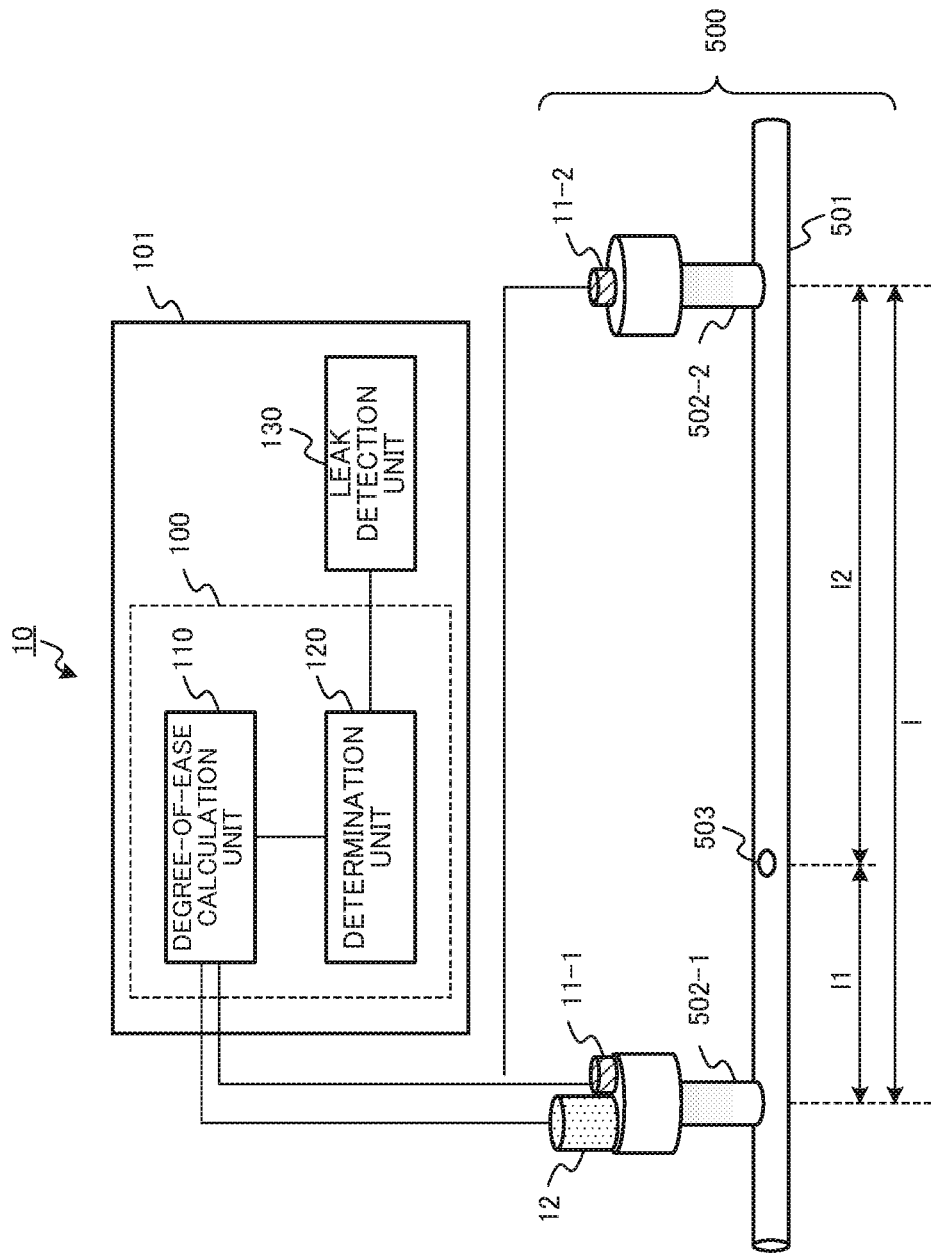
FIG. 3 is a diagram illustrating a configuration of a detection system and a piping network to be detected by the detection system in the first example embodiment of the present invention.

The detection device 101 including the measurement time determination device 100 detects a leak in piping and the like that transports water, oil, gas, and the like. FIG. 3 is a diagram illustrating an example of a configuration of a detection system 10 that includes the detection device 101 and detects presence or absence of a leak in a water distribution network 500. The detection system 10 includes the detection device 101, a measurement unit 11, and a vibration unit 12.

In the example illustrated in FIG. 3, two fire hydrants 502 which are a fire hydrant 502-1 and a fire hydrant 502-2 are provided in piping 501 constituting the water distribution network 500. It is assumed that a distance along the piping 501 from the fire hydrant 502-1 to the fire hydrant 502-2 is I. Further, as in the example illustrated in FIG. 3, a leak hole 503 may be generated in the piping 501. It is assumed in this example that the leak hole 503 is generated in a position having a distance $I_1$ from a measurement unit 11-1 and a distance $I_2$ from a measurement unit 11-2.

Further, it is assumed that the measurement unit 11-1 and the vibration unit 12 are attached to the fire hydrant 502-1, and the measurement unit 11-2 is attached to the fire hydrant 502-2. The detection device 101 is connected to each of the measurement unit 11 and the vibration unit 12 via any wired or wireless communication network. In the example illustrated in FIG. 3, the detection system 10 includes two measurement units 11 which are a measurement unit 11-1 and a measurement unit 11-2. However, the number of the measurement units 11 is not particularly limited as long as it is two or more. The number of measurement units 11 is appropriately determined according to the water distribution network 500 being a target.

The measurement unit 11 senses a wave motion propagating through piping or a fluid in the piping. The wave motion includes vibration, a pressure wave, or the like. A case where the measurement unit 11 mainly measures vibration is assumed in the following description. The measurement unit 11 may be installed on an outer wall surface and an inner wall surface of the piping 501, and may be installed on an outer surface and the inside of a flange (not illustrated) installed on the piping 501 and an appendage (not illustrated) such as a valve plug. In the example illustrated in FIG. 3, each of the measurement units 11-1 and 11-2 is respectively installed on each of the fire hydrants 502. A method of installing the measurement unit 11 on the piping and the like includes, for example, use of a magnet, use of a special jig, use of an adhesive, and the like.

Figure 4:
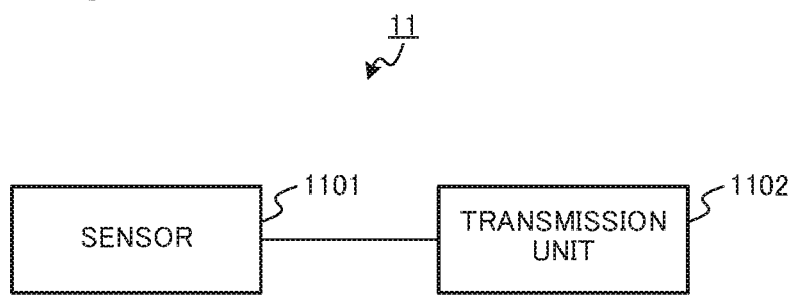
FIG. 4 is a diagram illustrating one configuration example of a measurement unit in the detection system in the first example embodiment of the present invention.

FIG. 4 illustrates one configuration example of the measurement unit 11. The measurement unit 11 includes a sensor 1101 and a transmission unit 1102. Note that a configuration of the measurement unit 11 is not limited to the example illustrated in FIG. 4, and may have another configuration.

The sensor 1101 senses a wave motion of the piping. More specifically, the sensor 1101 senses a propagating wave motion generated due to a state of the piping 501 or a fluid flowing inside the piping 501. The wave motion propagates to the sensor 1101 via the piping 501, an appendage such as the fire hydrant 502 installed on the piping 501, and the like. The sensor 1101 may be permanently installed and always sense vibration, or may be installed for a predetermined period and intermittently sense vibration. As the sensor 1101, for example, a sensor that measures vibration of a solid object is used. As the sensor, a piezoelectric acceleration sensor, an electrodynamic acceleration sensor, a capacitance acceleration sensor, an optical velocity sensor, a dynamic strain sensor, or the like is used. The transmission unit 1102 transmits vibration data sensed by the sensor 1101 to the measurement time determination device 100 or the detection device 101.

The vibration unit 12 adds vibration to the piping. The vibration unit 12 may be installed on the outer wall surface and the inner wall surface of the piping 501, and may be installed on an outer surface and the inside of a flange installed on the piping 501 and an appendage such as a valve plug. In a case of the example illustrated in FIG. 3, the vibration unit 12 is installed on the fire hydrant of the piping 501.

Figure 5:
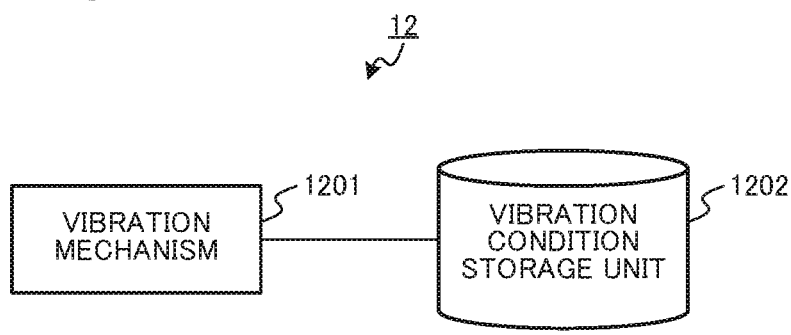
FIG. 5 is a diagram illustrating one configuration example of a vibration unit in the detection system in the first example embodiment of the present invention.

FIG. 5 illustrates one configuration example of the vibration unit 12. The vibration unit 12 includes a vibration mechanism 1201 and a vibration condition storage unit 1202. Note that the configuration of the vibration unit 12 is not limited to the example illustrated in FIG. 5, and may have another configuration.

The vibration mechanism 1201 adds vibration to the piping 501. As the vibration mechanism 1201, a mechanism such as a motor or an actuator is used. The vibration condition storage unit 1202 stores a condition when vibration is added by the vibration mechanism 1201, such as a vibration signal and a vibration time by the vibration mechanism 1201. As the vibration signal, a signal such as white noise, a chirp wave, or a pulse wave is used. Further, a signal having a limited band may be used according to a band of vibration generated by a leak of a fluid from the piping 501.

Next, each component of the measurement time determination device 100 in the first example embodiment of the present invention is described.

The degree-of-ease calculation unit 110 calculates degree-of-ease of detecting a leak in piping, based on vibration propagating through the piping or a fluid flowing through the piping when the piping is vibrated.

Prior to detailed description of the degree-of-ease calculation unit 110, a relationship between leak vibration and a measurement time is described. When the leak detection unit 130 detects presence or absence of a leak and a position in which the leak occurs, a cross-correlation function is used. For example, the leak detection unit 130 determines that there is a leak when a value of a cross-correlation function calculated from data about a wave motion such as vibration sensed by the two measurement units 11 exceeds a threshold value. The leak detection unit 130 calculates a position in which the leak occurs, based on an arrival time difference of the data in which the value of the cross-correlation function exceeds the threshold value among the data about the wave motion sensed by the two measurement units 11.

Figure 6:
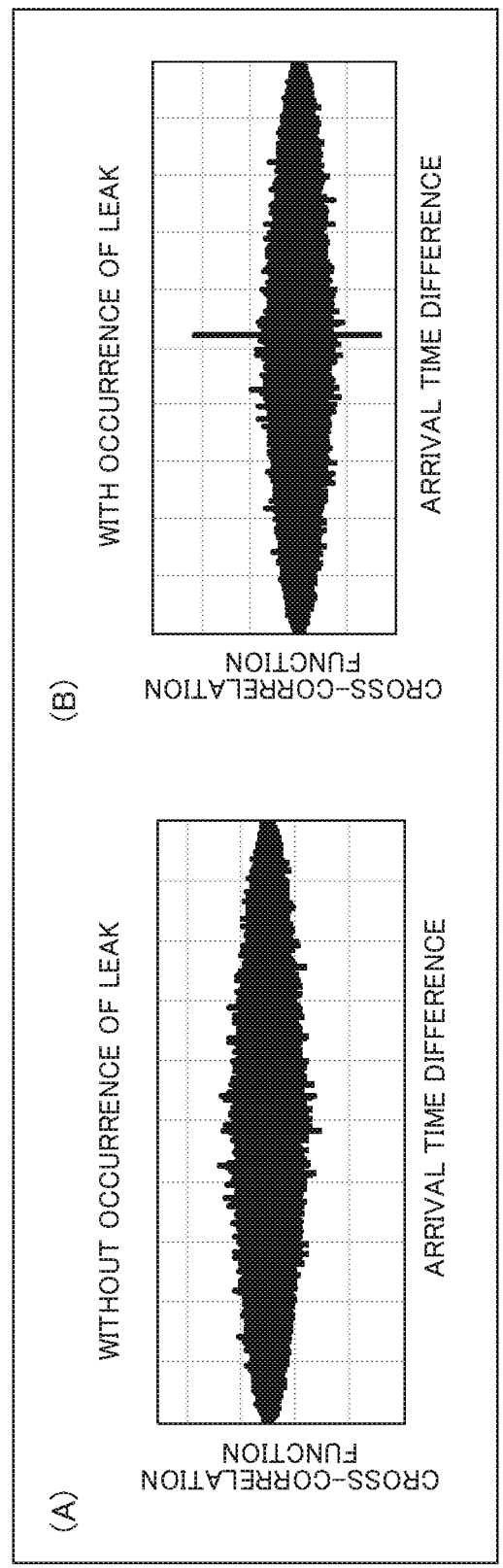
FIG. 6 is a diagram illustrating an example of a cross-correlation function with respect to a signal measured in the measurement unit.

Examples of a cross-correlation function acquired from data about a wave motion such as vibration sensed by the two measurement units 11 are illustrated in FIG. 6. (A) of FIG. 6 is an example when a leak does not occur in the piping 501 to be measured by the measurement units 11. (B) of FIG. 6 is an example when a leak occurs in the piping 501 to be measured by the measurement units 11. In the examples illustrated in FIG. 6, a horizontal axis is a difference in arrival time of vibration to the two measurement units 11, and a vertical axis is magnitude of a cross-correlation function.

As illustrated in (A) of FIG. 6, when a leak does not occur in the piping 501, noise other than leak vibration is included in data about vibration sensed by the two measurement units 11. Since noise is randomly generated in general, it is assumed that there is no correlation or a small correlation in data about vibration of noise sensed by the two measurement units 11. Thus, in the example illustrated in (A) of FIG. 6, a clear peak does not occur in the cross-correlation function for the data about the vibration.

On the other hand, when the two measurement units 11 measure the same leak vibration, it is assumed that there is a correlation in data about the leak vibration measured by the two measurement units 11. Thus, as illustrated in (B) of FIG. 6, when a leak occurs in the piping 501 and the leak vibration is sensed by the two measurement units 11, a peak being a place having magnitude of the cross-correlation function greater than that at the other place occurs. Note that the peak of the cross-correlation function occurs in a position of an arrival time difference corresponding to a difference (difference between $I_1$ and $I_2$ in the example in FIG. 3) in distance from the position in which the leak hole 503 is generated to the two measurement units 11.

A threshold value related to presence or absence of a leak is, for example, determined to be in between magnitude of a cross-correlation function at a place where magnitude of a cross-correlation function according to leak vibration peaks and magnitude of a cross-correlation function at the other place. The threshold value is determined in such a way, and thus a detection of presence or absence of a leak by the leak detection unit 130 can be achieved.

The peak of the magnitude of the cross-correlation function due to the leak vibration varies in clearness and the like with each piping. For example, when attenuation of leak vibration propagating through piping is great and when surrounding noise is loud, a difference between magnitude of the leak vibration and magnitude of the noise is relatively small. In other words, a peak of the magnitude of the cross-correlation function corresponding to the leak vibration may become unclear. Thus, it is assumed that it becomes difficult to detect presence or absence of a leak.

On the other hand, when surrounding noise is small, even in a case where attenuation of leak vibration propagating through piping is great, a difference between magnitude of the leak vibration and magnitude of the noise is relatively small. In other words, a peak of the magnitude of the cross-correlation function corresponding to the leak vibration is assumed to be clear. Thus, in such a case, presence or absence of a leak is easily detected.

In other words, it is assumed that degree-of-ease of leak detecting is determined by a relationship between a signal being vibration to be sensed, such as leak vibration, and noise generated due to a cause other than the leak vibration among data about vibration and the like measured by the measurement units 11. The relationship between the signal and the noise includes, for example, a signal-to-noise ratio of a cross-correlation function, and the like.

Further, a peak of a cross-correlation function due to leak vibration changes according to a measurement time for vibration used when acquiring cross-correlation.

When a measurement time used for calculating a cross-correlation is short, a peak of the cross-correlation function due to leak vibration may not be clear. As a result, a false detection may occur in regard to a detection on presence or absence of a leak. As an example of the false detection, there is false negative indicating no occurrence of a leak even when the leak occurs in reality.

A signal-to-noise ratio of a cross-correlation function is expressed by an equation (1) below.

[Equation 1]

$$\text{A signal-to-noise ratio of a cross-correlation function} = \sqrt{\frac{2f_s t}{\left(1+\left(\frac{\sigma_{n1}}{\sigma_{s1}}\right)^2\right)\left(1+\left(\frac{\sigma_{n2}}{\sigma_{s2}}\right)^2\right)}} \quad (1)$$

Note that, in the equation (1), $f_s$ represents a sampling frequency when vibration is measured by the measurement units 11, and t represents a time length of measurement performed by the measurement units 11. Further, each of $\sigma_{s1}$ and $\sigma_{n1}$ is a standard deviation indicating magnitude of vibration and noise to be measured included in a signal measured by the measurement unit 11-1. Similarly, each of $\sigma_{s2}$ and $\sigma_{n2}$ is a standard deviation indicating magnitude of vibration and noise to be measured included in a signal measured by the measurement unit 11-2.

Figure 7:
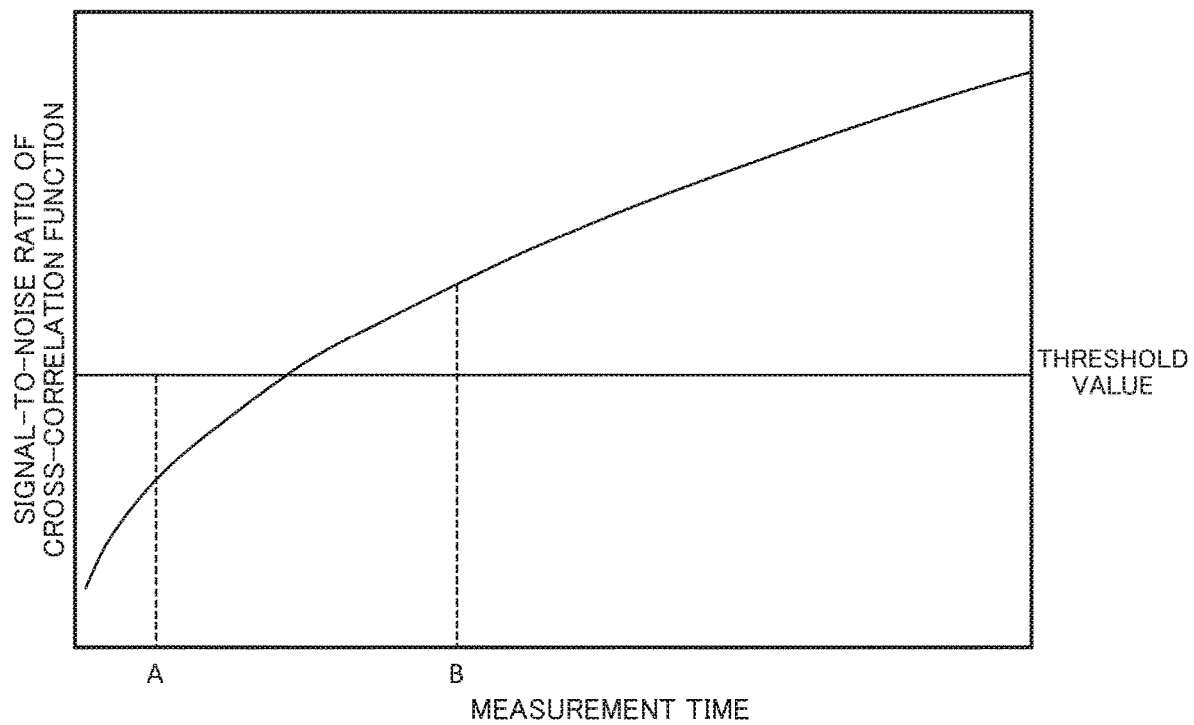
FIG. 7 is a diagram illustrating a relationship between a measurement time for a leak and a signal-to-noise ratio of the cross-correlation function.

As indicated in the equation (1), a signal-to-noise ratio of a cross-correlation function changes according to a time length of measurement performed by the measurement units 11. A relationship between a measurement time by the measurement units 11 and a signal-to-noise ratio of a cross-correlation function is illustrated as FIG. 7. In the example in FIG. 7, a horizontal axis represents a length of the measurement time, and a vertical axis represents magnitude of the signal-to-noise ratio of the cross-correlation function.

The signal-to-noise ratio of the cross-correlation function increases along with an increase in a measurement time t. In the example in FIG. 7, for example, a case where it is detected that a leak occurs when the signal-to-noise ratio of the cross-correlation function is greater than a threshold value indicated by a solid line in the diagram is assumed. Thus, in this case, occurrence of a leak is correctly detected. However, when the measurement time is A, the signal-to-noise ratio of the cross-correlation function is smaller than the threshold value. Therefore, a possibility of the false negative described above occurs. In contrast, when the measurement time is B, the signal-to-noise ratio of the cross-correlation function is greater than the threshold value. Thus, in this case, presence or absence of a leak is appropriately detected.

In other words, a measurement time necessary for leak detecting changes according to a relationship between a signal of vibration propagating through the piping 501 or a fluid in the piping 501 and noise, such as a signal-to-noise ratio of a cross-correlation function, for example.

Thus, the degree-of-ease calculation unit 110 calculates degree-of-ease of leak sensing as a premise for acquiring a measurement time necessary for the leak detecting. The degree-of-ease of the leak detecting includes a relationship between a signal included in a wave motion of vibration and the like measured by the measurement units 11 and noise. Further, an indicator and the like related to a signal or noise that affects the relationship may be included in the degree-of-ease of the leak detecting. The degree-of-ease of the leak detecting also includes a signal-to-noise ratio of a cross-correlation function. The degree-of-ease calculation unit 110 acquires, for example, an indicator indicating the degree-of-ease of the leak detecting as described above. Hereinafter, the indicator indicating the degree-of-ease of the leak detecting may be referred to as a degree of ease.

In the present example embodiment, the degree-of-ease calculation unit 110 calculates at least a degree of attenuation of a signal propagating through piping as one of indicators indicating the degree-of-ease of the leak detecting. A signal-to-noise ratio of a cross-correlation function changes according to a degree of attenuation propagating through piping. Thus, the degree-of-ease of the leak detecting changes according to the degree of the attenuation of the signal propagating through the piping. In other words, the degree of the attenuation propagating through the piping is one of indicators that affect the relationship between the signal and the noise described above.

Further, when calculating a degree of attenuation, the degree-of-ease calculation unit 110 uses, as vibration to be a signal propagating through piping, vibration added to the piping 501 by the vibration unit 12, for example. A measurement of vibration having desired magnitude can be achieved by using the vibration added to the piping by the vibration unit 12.

It is assumed that $\sigma_{gene}$ is a standard deviation indicating magnitude of vibration added to the piping 501 by the vibration unit 12. Further, it is assumed that $\sigma_{s1}$ is a standard deviation indicating magnitude of the vibration when the vibration is sensed by the measurement unit 11-1, and $\sigma_{s2}$ is a standard deviation indicating magnitude of the vibration when the vibration is sensed by the measurement unit 11-2. Further, attenuation of the vibration propagating through the piping 501 and the like is represented by α. α is also referred to as an attenuation characteristic of the vibration propagating through the piping. The degree-of-ease calculation unit 110 calculates α being the attenuation of the vibration propagating through the piping 501 and the like as the degree-of-ease of the leak detecting.

Note that when the measurement unit 11-1 or 11-2 senses noise of vibration and the like, the noise is included in a sensed signal. When the measurement units 11-1 and 11-2 sense vibration added by the vibration unit 12, the degree-of-ease calculation unit 110 determines that the added vibration is sensed when a peak of magnitude of a cross-correlation function in a sensing result is greater than magnitude of noise being previously calculated.

When arrangement of the measurement units 11-1 and 11-2 and the vibration unit 12 as illustrated in FIG. 3 is assumed, a relationship among $\sigma_{gene}$, $\sigma_{s1}$, $\sigma_{s2}$, and α is expressed as an equation (2-1) and an equation (2-2) below.

[Equation 2]

$$\sigma_{s1} = \sigma_{gene} \quad (2\text{-}1)$$

$$\sigma_{s2} = \sigma_{gene} e^{-\alpha l} \quad (2\text{-}2)$$

By using the equation (2-1) and the equation (2-2), attenuation α of vibration propagating through piping is expressed as an equation (3) below. The degree-of-ease calculation unit 110 calculates α being a degree of attenuation of the signal propagating through the piping by using the equation (3) below. As described above, the attenuation α is one of the indicators that indicates the degree-of-ease of the leak detecting.

[Equation 3]

$$\alpha = -\frac{1}{l} \log \frac{\sigma_{s2}}{\sigma_{s1}} \quad (3)$$

The determination unit 120 determines a measurement time necessary for detection a leak. In the present example embodiment, the determination unit 120 determines the measurement time by using the attenuation α in the piping that is an indicator indicating the degree-of-ease of the leak detecting and is calculated by the degree-of-ease calculation unit 110.

It is assumed that each of $\sigma_{n1}$ and $\sigma_{n2}$ is a standard deviation indicating magnitude of vibration being noise. Each of $\sigma_{n1}$ and $\sigma_{n2}$ is calculated, based on magnitude of vibration sensed by each of the measurement units 11-1 and 11-2 when a leak does not occur and vibration is not added by the vibration unit 12. Then, a threshold value of a signal-to-noise ratio of a cross-correlation function used when the leak detection unit 130 of the detection device 101 detects occurrence of a leak is assumed as "threshold". In other words, when the signal-to-noise ratio of the cross-correlation function calculated, based on the vibration sensed by each of the measurement units 11-1 and 11-2, is greater than "threshold", the leak detection unit 130 of the detection device 101 determines that a leak occurs. "threshold" is appropriately determined, based on magnitude corresponding to noise of a cross-correlation function and magnitude assumed as a signal.

Then, a case where leak vibration having magnitude corresponding to $\sigma_{leak}$ is generated by the leak hole 503 generated in the position illustrated in FIG. 3 is assumed. In this case, the determination unit 120 determines, by using an equation (4) below, a measurement time for vibration necessary for detecting occurrence of a leak by detecting the leak vibration. Note that a length of the fire hydrant may be considered for $I_1$ and $I_2$ illustrated in FIG. 3, or the length of the fire hydrant may be ignored. $I_1$ and $I_2$ may be appropriately determined according to a position in which the leak hole 503 is assumed to be generated. Further, $\sigma_{leak}$ may be appropriately determined according to a kind and the like of the piping 501 to be measured.

[Equation 4]

$$t = \frac{threshold^2 \left(1 + \left(\frac{\sigma_{n1}}{\sigma_{leak} e^{-\alpha l_1}}\right)^2\right)\left(1 + \left(\frac{\sigma_{n2}}{\sigma_{leak} e^{-\alpha l_2}}\right)^2\right)}{2 f_s} \quad (4)$$

In other words, when a signal-to-noise ratio of a cross-correlation function calculated based on a measurement result in which a measurement time is greater than or equal to t does not exceed "threshold", it can be confirmed that leak vibration having magnitude of less than or equal to $\sigma_{leak}$ is not generated.

Note that, as indicated in the equation (4), a measurement time may change according to magnitude of $\sigma_{leak}$ to be assumed. Thus, a measurement time may be determined for each of a plurality of $\sigma_{leak}$ having different magnitude.

Figure 8:
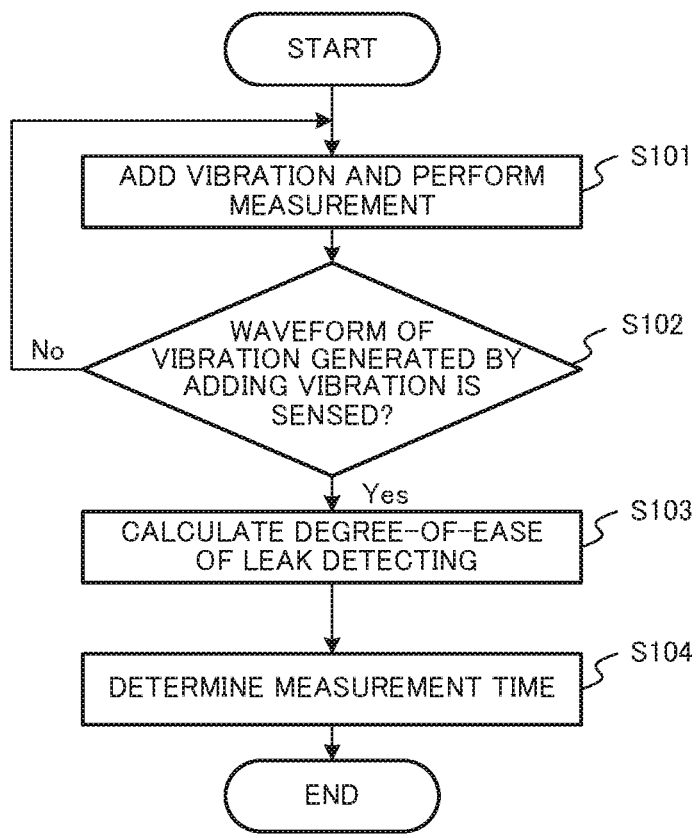
FIG. 8 is a flowchart illustrating an operation of the measurement time determination device in the first example embodiment of the present invention.

Next, one example of an operation of the measurement time determination device 100 and the like in the first example embodiment of the present invention is described with reference to a flowchart illustrated in FIG. 8.

First, addition of vibration by the vibration unit 12 in the detection system 10 and a measurement of the added vibration by the measurement units 11-1 and 11-2 are performed. The degree-of-ease calculation unit 110 acquires a result measured by the measurement units 11-1 and 11-2 (Step S101).

Next, the degree-of-ease calculation unit 110 detects whether a waveform of the vibration generated by adding the vibration by the vibration unit 12 is sensed (Step S102). In this case, the degree-of-ease calculation unit 110 makes the detection by analyzing the result of the measurement by the measurement units 11 acquired in Step S101. Whether the waveform of the vibration generated by adding the vibration by the vibration unit 12 is sensed is determined by whether or not a peak of magnitude of a cross-correlation function in the result measured by the measurement units 11-1 and 11-2 exceeds a predetermined condition, and the like.

When the degree-of-ease calculation unit 110 determines that the waveform of the vibration generated by adding the vibration by the vibration unit 12 is sensed (Step S102: Yes), the degree-of-ease calculation unit 110 calculates degree-of-ease of leak detecting (Step S103). In the present example embodiment, the degree-of-ease calculation unit 110 calculates attenuation α of vibration propagating through piping as an indicator indicating the degree-of-ease of the leak detecting by using the equation (3). As described above, the attenuation α is one of indicators indicating the degree-of-ease of the leak detecting. Further, the degree-of-ease calculation unit 110 may also calculate $\sigma_{n1}$ and $\sigma_{n2}$ described above.

When the degree-of-ease calculation unit 110 determines that the waveform of the vibration generated by adding the vibration by the vibration unit 12 is not sensed (Step S102: No), the degree-of-ease calculation unit 110 returns the processing to Step S101, and repeatedly performs the processing in Steps S101 and S102.

In this case, a measurement for a longer time than a previous measurement, for example, is performed in the measurement units 11-1 and 11-2. The degree-of-ease calculation unit 110 acquires a result of the measurement for the loner time. Further, in Step S102 in this case, when a cross-correlation function is acquired by using data for a part of a time zone among data about the measured vibration, the degree-of-ease calculation unit 110 may acquire the cross-correlation function by using data for a longer time zone, and make a determination.

Continuing from Step S103, the determination unit 120 determines a measurement time necessary for detecting a leak (Step S104). The determination unit 120 determines the measurement time necessary for detecting a leak by the equation (4) described above. The values acquired in Step S103 are used as the attenuation α of the vibration and the magnitude $\sigma_{n1}$ and $\sigma_{n2}$ of noise vibration included in the equation (4).

When the measurement time is determined in Step S104, the leak detection unit 130 of the detection device 101 appropriately detects presence or absence of a leak. The leak detection unit 130 detects presence or absence of a leak by using the measured result measured by the measurement units 11 by the measurement for the measurement time determined by the determination unit 120. The measurement time is determined in such a way, and thus occurrence of false negative can be suppressed in regard to leak vibration having magnitude of the vibration greater than or equal to $\sigma_{leak}$ described above.

As described above, the measurement time determination device 100 in the first example embodiment of the present invention determines a measurement time necessary for detecting a leak, based on degree-of-ease of leak detecting. The degree-of-ease of the leak detecting is represented by a relationship between a signal in a wave motion measured by the two measurement units 11 and noise, and an indicator related to the signal and the noise.

When it is detected as absence of a leak by a measurement for a time longer than or equal to a determined measurement time, from the relationships expressed in the equation (1) and the equation (4) described above, it may be considered that a leak having magnitude of vibration of greater than or equal to $\sigma_{leak}$ described above does not occur. Therefore, the measurement time determination device 100 in the present example embodiment reduces a false detection on leak detecting. Then, the detection device 101 or the detection system 10 including the measurement time determination device 100 can achieve leak detecting with less false detection.

Second Example Embodiment

Figure 9:
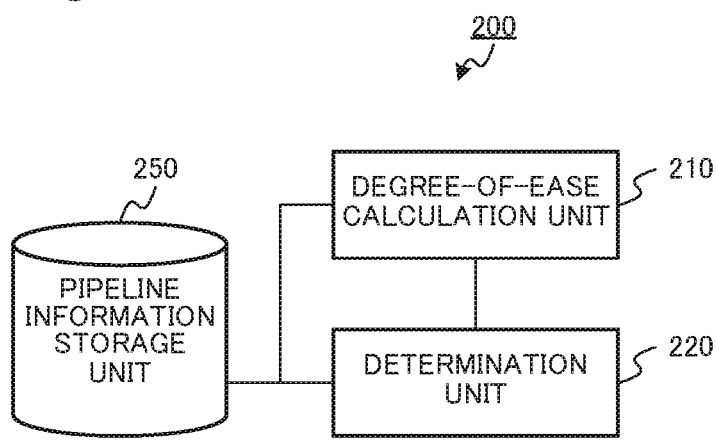
FIG. 9 is a diagram illustrating a configuration of a measurement time determination device in a second example embodiment of the present invention.

Next, a second example embodiment of the present invention is described. FIG. 9 illustrates a measurement time determination device 200 in the second example embodiment of the present invention.

As illustrated in FIG. 9, the measurement time determination device 200 in the present example embodiment includes a degree-of-ease calculation unit 210 and a determination unit 220. The degree-of-ease calculation unit 210 calculates degree-of-ease of leak detecting in piping, based on vibration propagating through the piping and the like when the piping is vibrated and information related to an element of the piping. The determination unit 220 determines a measurement time necessary for detecting a leak, based on the degree-of-ease of the leak detecting in the piping and the information related to the element of the piping.

The measurement time determination device 200 may include a pipeline information storage unit 250. The pipeline information storage unit 250 stores information related to attenuation of vibration in piping. The information related to the attenuation of the vibration in the piping includes information related to a branch and a place where pipes having different diameters, materials, or the like are connected to each other, or information related to an element such as a valve plug provided in the piping and a connection place. For example, information stored in the pipeline information storage unit 250 may be information related to a configuration of a water distribution network 500.

In the present example embodiment, the degree-of-ease calculation unit 210 is different from the degree-of-ease calculation unit 110 in the first example embodiment in that the degree-of-ease calculation unit 210 calculates degree-of-ease of leak detecting in piping, based on information related to an element of the piping in addition to vibration propagating through the piping and the like when the piping is vibrated. Further, the determination unit 220 is different from the determination unit 120 in the first example embodiment in that the determination unit 220 determines a measurement time, based on information related to an element of piping in addition to an indicator indicating degree-of-ease of leak detecting calculated by the degree-of-ease calculation unit 210. For other points, the measurement time determination device 200 includes a configuration similar to that of the measurement time determination device 100 in the first example embodiment. Also in the present example embodiment, an indicator similar to the indicator used in the first example embodiment is used as an indicator indicating degree-of-ease of leak detecting.

Further, a detection device 201 and a detection system 20 are configured similarly to the detection device 101 and the detection system 10 in the first example embodiment. Examples of the detection device 201 and the detection system 20 are illustrated in FIG. 10 described later.

In the water distribution network 500, piping 501 includes a branch and a place where pipes having different diameters, materials, or the like are connected to each other. Further, elements such as a valve plug are connected to the water distribution network 500. Vibration propagating through the piping 501 is generally attenuated in these elements of the piping. Thus, in the present example embodiment, the measurement time determination device 200 determines time necessary for leak detecting with consideration given to the attenuation of the vibration by these elements, based on information related to the elements of the piping. Note that, in the following description, an element of piping related to attenuation of vibration may be referred to as a "pipeline element".

Figure 10:
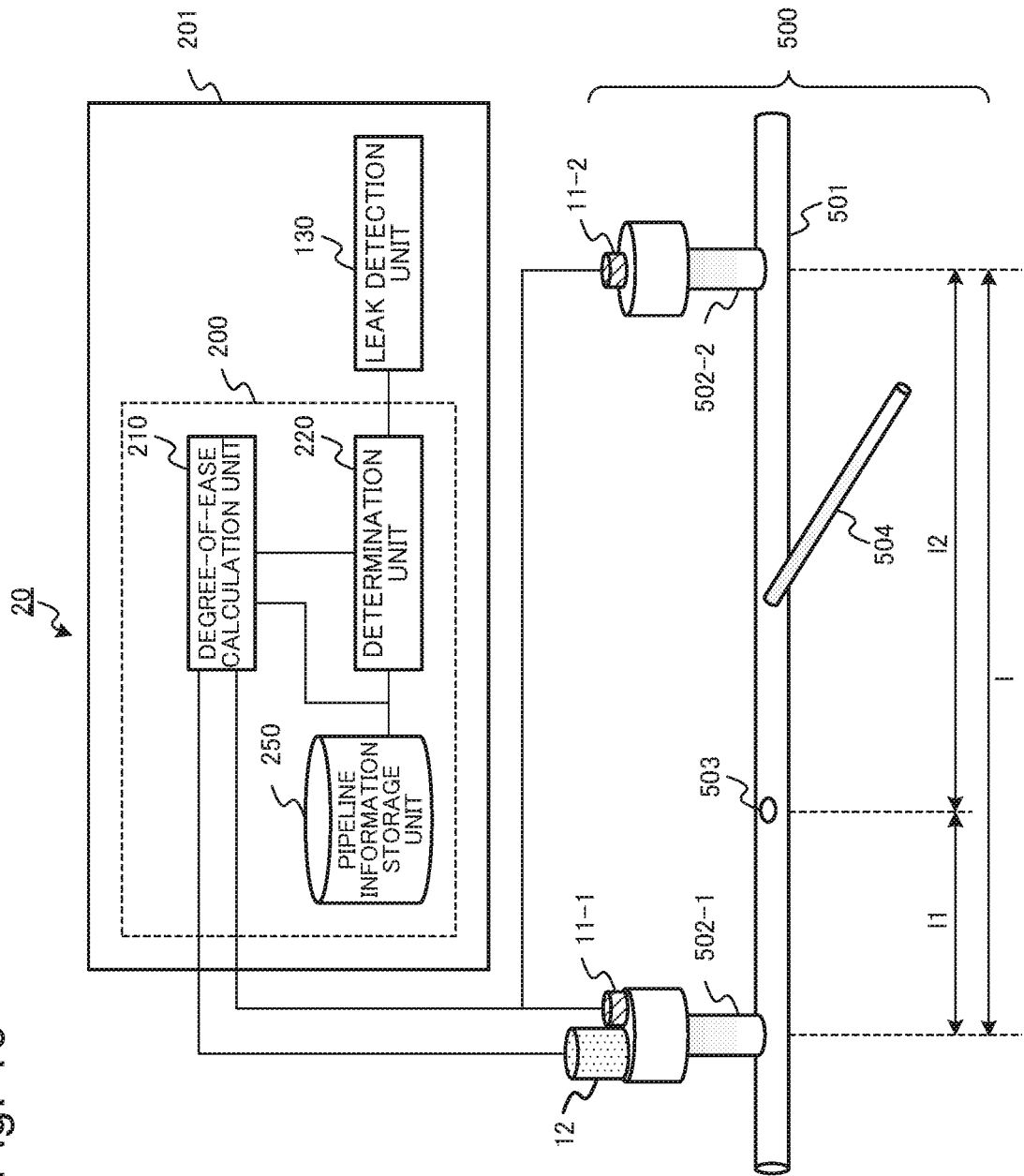
FIG. 10 is a diagram illustrating a configuration of a detection system and a piping network to be detected by the detection system in the second example embodiment of the present invention.

FIG. 10 is a diagram illustrating a configuration of the water distribution network 500 and the detection system 20 when a branch 504 being a pipeline element is provided in the piping 501. It is assumed in the example illustrated in FIG. 10 that a leak hole 503 is generated between the branch 504 and a fire hydrant 502-1. It is assumed that vibration generated by adding vibration by a vibration unit 12 and leak vibration generated by the leak hole 503 are attenuated by the branch 504.

The degree-of-ease calculation unit 210 determines a pipeline element included in the piping 501 to be a target for leak detecting, based on information related to an element of the piping. In this case, the degree-of-ease calculation unit 210 acquires information related to the pipeline element, such as a kind and a position of the pipeline element included in the piping 501 and a degree of attenuation of vibration due to the pipeline element. When a plurality of pipeline elements are provided in the piping 501 to be the target for the leak detecting, the degree-of-ease calculation unit 210 acquires information related to the pipeline element for each of the plurality of pipeline elements. Note that, for example, information stored in the pipeline information storage unit 250 is used as the information related to the pipeline element and the like. Then, the degree-of-ease calculation unit 210 calculates a degree of attenuation of a signal propagating through the piping with consideration given to the attenuation of the vibration due to the pipeline element.

It is assumed that the attenuation of the vibration and the like due to the pipeline element in the piping 501 to be the target for the leak detecting is represented by $\beta$. For example, in the water distribution network 500 illustrated in FIG. 10, the attenuation $\beta$ represents attenuation of vibration and the like due to the branch 504. Note that it is assumed that a plurality of pipeline elements are provided between measurement units 11-1 and 11-2. In this case, the attenuation $\beta$ of the vibration due to the pipeline elements is treated as a sum of $\beta_1$ to $\beta_n$. Note that each $\beta$ may be a value acquired experimentally, and may be a value acquired by a simulation. These values are, for example, previously acquired and stored in the pipeline information storage unit 250.

In the present example embodiment, when arrangement of the measurement units 11-1 and 11-2, the vibration unit 12, and the branch 504 as illustrated in FIG. 10 is assumed, a relationship among $\sigma_{gene}$, $\sigma_{s1}$, $\sigma_{s2}$, $\alpha$, and $\beta$ is expressed as an equation (5-1) and an equation (5-2) below.

[Equation 5]

$$\sigma_{s1} = \sigma_{gene} \qquad (5\text{-}1)$$

$$\sigma_{s2} = \sigma_{gene} e^{\alpha l} e^{-\beta} \qquad (5\text{-}2)$$

In other words, vibration measured by the measurement unit 11-2 is attenuated by both of the piping and the pipeline element. Then, by using the equation (5-1) and the equation (5-2), attenuation $\alpha$ of the vibration propagating through the piping is expressed as an equation (6) below. The degree-of-ease calculation unit 110 calculates the attenuation $\alpha$ by using the equation (6) below.

[Equation 6]

$$\alpha = -\frac{1}{l}\left(\log\frac{\sigma_{s2}}{\sigma_{s1}} + \beta\right) \qquad (6)$$

Figure 11:
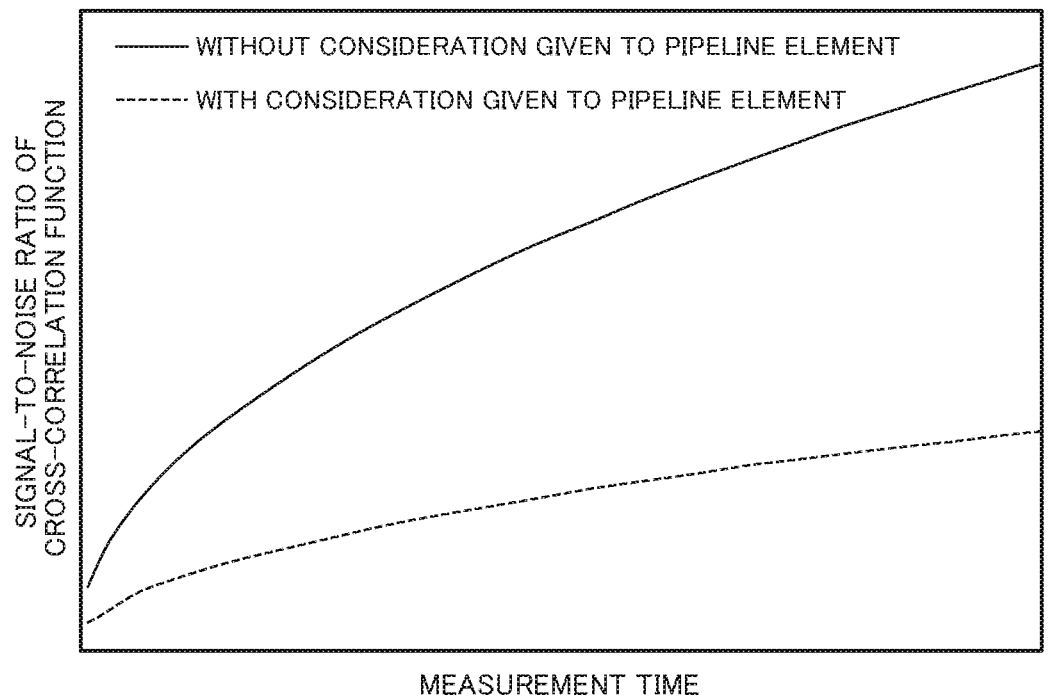
FIG. 11 is a diagram illustrating a difference according to consideration given to a pipeline element in a relationship between a measurement time for a leak and a signal-to-noise ratio of a cross-correlation function.

FIG. 11 is a graph illustrating a difference in signal-to-noise ratio of a cross-correlation function between vibrations measured by the measurement units 11-1 and 11-2 according to presence or absence of consideration given to attenuation of vibration and the like by a pipeline element. In the graph illustrated in FIG. 11, a solid line indicates a signal-to-noise ratio of a cross-correlation function without consideration given to attenuation of vibration and the like by a pipeline element. Further, in the graph illustrated in FIG. 11, a broken line indicates a signal-to-noise ratio of a cross-correlation function with consideration given to the attenuation of the vibration and the like by the pipeline element.

In other words, as indicated by the broken line in FIG. 11, it is illustrated that magnitude of the signal-to-noise ratio is reduced by the pipeline element. This indicates that a longer measurement time is needed due to the pipeline element when presence or absence of a leak is detected. The attenuation due to the pipeline element represented by $\beta$ corresponds to a difference between the two graphs illustrated in FIG. 11.

The determination unit 220 determines a measurement time, based on information related to an element of piping in addition to the attenuation $\alpha$ being an indicator indicating degree-of-ease of leak detecting calculated by the degree-of-ease calculation unit 210 as described above.

In the present example embodiment, the determination unit 220 determines a measurement time by using, for example, an equation (7) instead of the equation (4) described above. A positional relationship between the leak hole 503 and the branch 504 as illustrated in FIG. 10 is assumed in the equation (7).

[Equation 7]

$$t = \frac{threshold^2\left(1 + \left(\frac{\sigma_{n1}}{\sigma_{leak}e^{-\alpha l_1}}\right)^2\right)\left(1 + \left(\frac{\sigma_{n2}}{\sigma_{leak}e^{-\alpha l_2}e^{-\beta}}\right)^2\right)}{2f_s} \qquad (7)$$

Vibration generated in the leak hole 503 is attenuated by the piping 501 before reaching the measurement unit 11-1. Further, the vibration generated in the leak hole 503 is attenuated by the piping 501 and the branch 504 being a pipeline element before reaching the measurement unit 11-2. In a numerator on a right side of the equation (7), a last term includes a term indicating attenuation by the branch 504.

Note that a case where a plurality of pipeline elements in addition to the branch 504 is included and a case where a pipeline element is included between the fire hydrant 502-1 and the leak hole 503 are assumed. In these cases, the determination unit 220 determines a measurement time by using an equation acquired by appropriately modifying the equation (7) according to the pipeline element.

Figure 12:
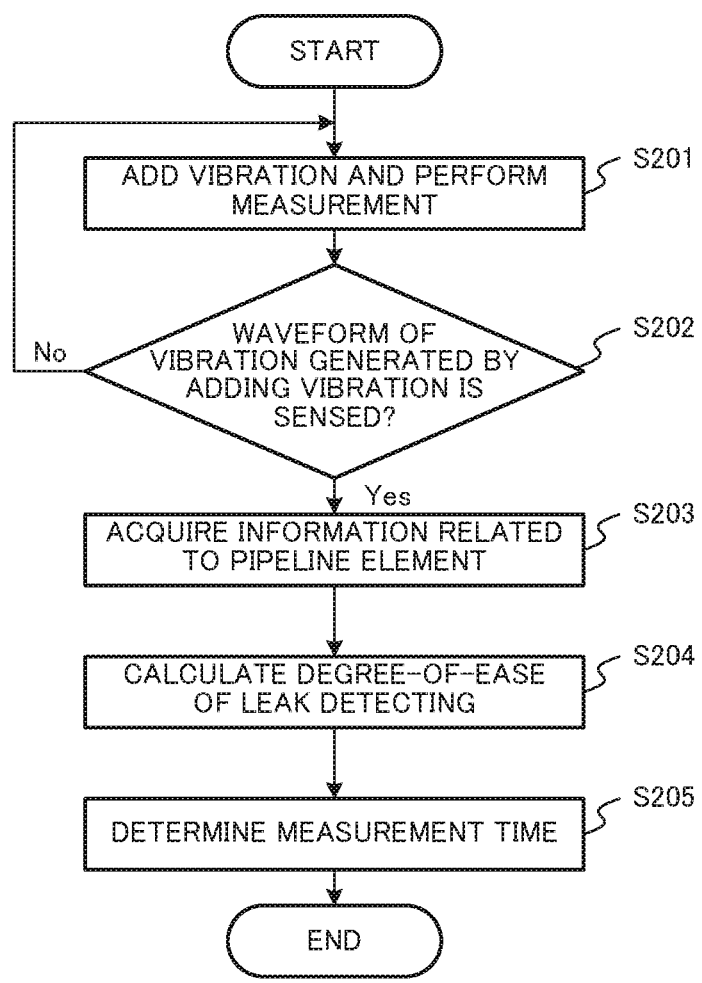
FIG. 12 is a flowchart illustrating an operation of the measurement time determination device in the second example embodiment of the present invention.

Next, one example of an operation of the measurement time determination device 200 in the second example embodiment of the present invention is described with reference to a flowchart illustrated in FIG. 12.

First, addition of vibration by the vibration unit 12 in the detection system 10 and a measurement of the added vibration by the measurement units 11-1 and 11-2 are performed. The degree-of-ease calculation unit 210 acquires a result measured by the measurement units 11-1 and 11-2 (Step S201).

Next, the degree-of-ease calculation unit 210 detects whether a waveform of vibration generated by adding the vibration by the vibration unit 12 is sensed (Step S202). The operations in Steps S201 and S202 are respectively performed similarly to the operations in Steps S101 and S102 in the first example embodiment.

When the degree-of-ease calculation unit 210 detects that the waveform of the vibration generated by adding the vibration by the vibration unit 12 is sensed (Step S202: Yes), the degree-of-ease calculation unit 210 performs an operation in Step S203. In Step S203, the degree-of-ease calculation unit 210 acquires information related to a pipeline element included in the piping 501 to be measured and detected by, for example, referring to information stored in the pipeline information storage unit 250, and the like.

When the degree-of-ease calculation unit 210 determines that the waveform of the vibration generated by adding the vibration by the vibration unit 12 is not sensed (Step S202: No), the degree-of-ease calculation unit 210 returns the processing to Step S101, and repeatedly performs the processing in Steps S201 and S202. In this case, an operation similar to that when it is detected in S102 in the first example embodiment that the waveform of the vibration generated by adding the vibration by the vibration unit 12 is not sensed is performed.

Continuing from Step S203, the degree-of-ease calculation unit 210 calculates degree-of-ease of leak detecting, based on information related to an element of the piping in addition to the vibration propagating through the piping and the like when the piping is vibrated (Step S204). In the present example embodiment, the degree-of-ease calculation unit 210 calculates the attenuation $\alpha$ of the vibration propagating through the piping, which is one of indicators indicating the degree-of-ease of the leak detecting, by using the equation (6) with consideration given to the attenuation $\beta$ due to the pipeline element, and the like.

Next, the determination unit 220 determines a measurement time necessary for detecting a leak (Step S205). In Step S205, the determination unit 220 determines a measurement time by using the equation (7) described above, and the like. A value calculated by the degree-of-ease calculation unit 210 in Step S204 is used as the attenuation $\alpha$ of the vibration propagating through the piping 501.

When the measurement time necessary for detecting a leak is determined, the leak detection unit 130 of the detection device 201 appropriately detects presence or absence of a leak. The leak detection unit 130 detects presence or absence of a leak by using a measured result measured by the measurement units 11 by the measurement for the measurement time determined by the determination unit 220. The measurement time is determined in such a way, and thus occurrence of false negative can be suppressed in regard to leak vibration having magnitude of the vibration greater than or equal to $\sigma_{leak}$ described above, similarly to the example in the first example embodiment.

As described above, the measurement time determination device 200 in the present example embodiment also uses information related to an element of piping when calculating degree-of-ease of leak detecting and determining a measurement time. In other words, when a degree of attenuation of vibration propagating through piping is acquired, attenuation due to a pipeline element of the piping is considered. Further, when a measurement time is determined, a degree of attenuation of vibration propagating through piping calculated in consideration of attenuation due to a pipeline element of the piping is used.

Vibration propagating through piping is also attenuated by the pipeline element of the piping described above. In other words, degree-of-ease of leak detecting also changes according to the pipeline element of the piping. In the present example embodiment, a determined measurement time is a value in consideration of attenuation due to the pipeline element of the piping. Therefore, the measurement time determination device 200 in the present example embodiment and the measurement time determination device 100 in the first example embodiment further reduce a false detection on leak detecting. Then, the detection device 201 or the detection system 20 including the measurement time determination device 200 can achieve leak detecting with less false detection.

Third Example Embodiment

Figure 13:
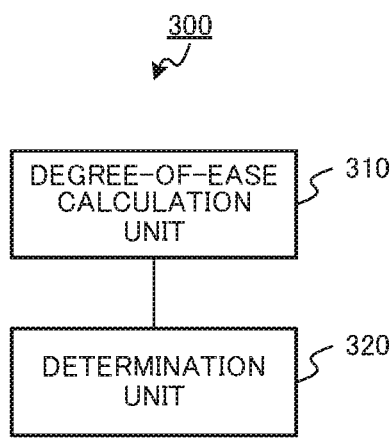
FIG. 13 is a diagram illustrating a configuration of a measurement time determination device in a third example embodiment of the present invention.

Next, a third example embodiment of the present invention is described. FIG. 13 is a diagram illustrating a measurement time determination device 300 in the third example embodiment of the present invention.

As illustrated in FIG. 13, the measurement time determination device 300 in the present example embodiment includes a degree-of-ease calculation unit 310 and a determination unit 320. The degree-of-ease calculation unit 310 calculates, as degree-of-ease of leak detecting, a signal-to-noise ratio of a cross-correlation function from each of a plurality of pieces of piping, based on vibration calculated by vibrating each of the pieces of piping. The determination unit 320 determines a measurement time necessary for leak detecting, based on a relationship between the signal-to-noise ratio determined from each of the plurality of pieces of piping and a result of a leak measurement in each of the plurality of pieces of piping. As one example, the determination unit 320 determines a measurement time necessary for leak detecting by learning a signal-to-noise ratio in each of a plurality of pieces of piping and a result of a leak measurement in the piping.

In other words, the measurement time determination device 300 in the present example embodiment is different from the measurement time determination devices in the first and second example embodiments in that the measurement time determination device 300 in the present example embodiment determines a measurement time by using degree-of-ease of leak detecting determined from a plurality of pieces of piping and a result of a leak measurement.

Figure 14:
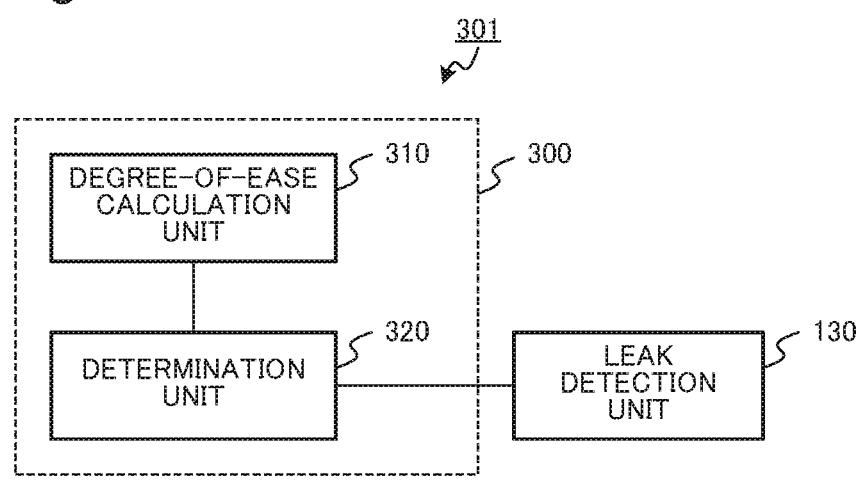
FIG. 14 is a diagram illustrating a configuration of a detection device in the third example embodiment of the present invention.

Further, as illustrated in FIG. 14, a detection device 301 including the measurement time determination device 300 is configured similarly to the detection device 101 and the like in the first example embodiment. The detection device 301 includes the measurement time determination device 300 and a leak detection unit 130. The leak detection unit 130 is an element similar to the leak detection unit 130 included in the detection device 101 in the first example embodiment and the like. Further, a detection system including the detection device 301 is configured similarly to the detection system 10 and the like in the first example embodiment.

Next, a component of the measurement time determination device 300 in the present example embodiment is described.

The degree-of-ease calculation unit 310 calculates a signal-to-noise ratio of a cross-correlation function from each of a plurality of pieces of piping, based on a result of a measurement in which vibration acquired by vibrating each of the plurality of pieces of piping is measured by two measurement units. The signal-to-noise ratio of the cross-correlation function is one of indicators indicating degree-of-ease of leak detecting.

The degree-of-ease calculation unit 310 calculates a signal-to-noise ratio of a cross-correlation function, based on a measurement result of vibration acquired by vibrating piping in which leak vibration is measured. However, when it is difficult to calculate a signal-to-noise ratio from piping in which leak vibration is measured, and the like, the degree-of-ease calculation unit 310 may calculate a signal-to-noise ratio, based on vibration acquired by vibrating piping under the same condition as piping in which leak vibration is measured. The piping under the same condition as the piping in which the leak vibration is measured includes piping of a kind having the same material, diameter, or the like, and piping having a similar peripheral situation, and the like.

Vibration added by the vibration unit 12 is used as vibration to be a signal. Magnitude of the signal is acquired by measuring the vibration added by the vibration unit 12 by each of measurement units 11-1 and 11-2 by, for example, using the equation (2-1) or the equation (2-2). Further, magnitude of noise is acquired by measuring vibration propagating through piping and the like by each of the measurement units 11-1 and 11-2 when the vibration is not added by the vibration unit 12.

The degree-of-ease calculation unit 310 calculates a signal-to-noise ratio by, for example, the equation (1) by using a measurement result of the vibration acquired as described above. The degree-of-ease calculation unit 310 calculates a signal-to-noise ratio from each of a plurality of pieces of piping by using the vibration and the like measured as described above from each of the plurality of pieces of piping. In this case, the degree-of-ease calculation unit 310 calculates a signal-to-noise ratio from each of the plurality of pieces of piping by using a measurement result acquired by adding vibration in the same condition. Note that, as described in the second example embodiment, a pipeline element of each piping may be considered.

The determination unit 320 determines a measurement time necessary for leak detecting, based on a result of a leak measurement in piping in which a signal-to-noise ratio of a cross-correlation function is acquired. As described above, the determination unit 320 statistically determines a time necessary for leak detecting from a plurality of pieces of piping by learning a relationship among a signal-to-noise ratio of a cross-correlation function acquired for each piping, a result of a leak measurement of the piping, and a measurement time for the leak measurement, and the like. In other words, the determination unit 320 statistically determines a measurement time necessary for leak detecting by learning a result of a leak measurement, and the like.

Details of a procedure of determining a measurement time by the determination unit 320 are further described. The determination unit 320 determines a relationship between a signal-to-noise ratio calculated by the degree-of-ease calculation unit 310 and a result of a leak measurement corresponding to each signal-to-noise ratio.

Figure 15:
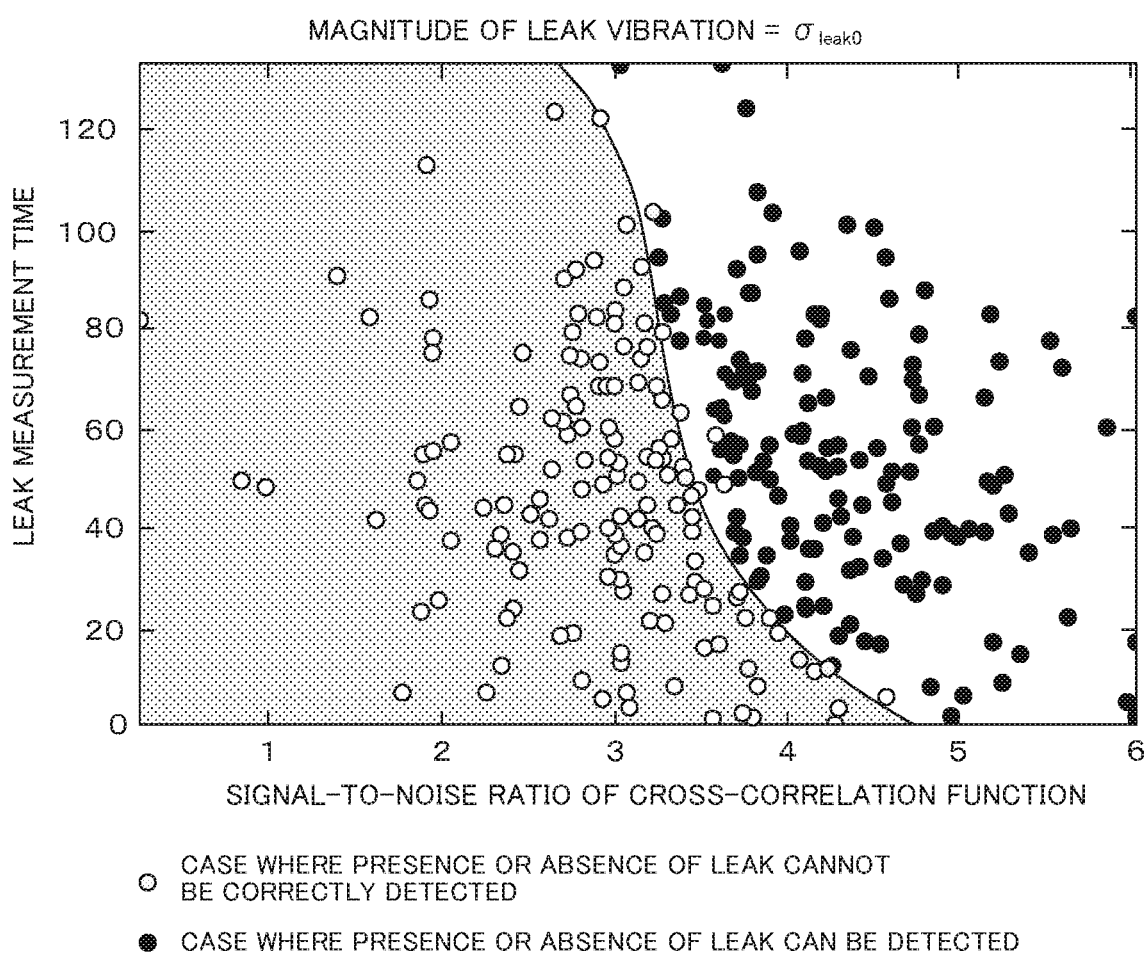
FIG. 15 is a diagram illustrating one example of a relationship between a signal-to-noise ratio of a cross-correlation function and a measurement time when presence or absence of a leak is detected.

FIG. 15 illustrates one example of a relationship between a signal-to-noise ratio and a result of a leak measurement. In FIG. 15, a horizontal axis represents a signal-to-noise ratio of a cross-correlation function when vibration acquired by vibrating piping by the vibration unit 12 is measured by the two measurement units 11. Further, a vertical axis represents a measurement time when a leak measurement is performed. Each of dots in FIG. 15 is acquired by plotting, for each of a plurality of pieces of piping, a signal-to-noise ratio acquired from the piping as the horizontal axis and a measurement time when a leak measurement is performed in the piping as the vertical axis.

Further, a result of the leak measurement is indicated by each of the dots in FIG. 15. The leak measurement is performed on piping in which it is detected that a leak has already occurred. It is assumed that the magnitude of leak vibration is $\sigma_{leak0}$. In FIG. 15, a black circular dot indicates a case where it is determined in a corresponding leak measurement that there is a leak. Further, a white circular dot indicates a case where it is determined in a corresponding leak measurement that there is no leak, that is, a case where it cannot be detected that there is a leak. In other words, the black circular dot corresponds to a case where presence or absence of a leak can be correctly detected, and the white circular dot corresponds to a case of false negative where presence or absence of a leak cannot be detected.

In FIG. 15, a region of the graph illustrated in FIG. 15 is divided into a region where presence or absence of a leak may be correctly detected and a region where presence or absence of a leak may not be correctly detected, based on a result of presence or absence of a leak corresponding to each plotted relationship.

In other words, a left gray region in FIG. 15 is assumed to be a region where a leak cannot be sensed even when a leak occurs in piping. Further, a right white region in FIG. 15 is assumed to be a region where a leak can be detected. Then, a boundary between the two regions is a least measurement time necessary for detecting a leak. In the present example embodiment, since a plurality of pieces of piping are targets, a measurement time necessary for detecting a leak is a time changes according to a signal-to-noise ratio of a cross-correlation function.

The determination unit 320 determines a measurement time by acquiring the boundary between the two regions described above. As one specific example, the determination unit 320 generates, by machine learning and the like, an identifier configured in such a way as to identify the two regions described above. An identifier, a learning procedure, and the like are not particularly limited, and any technique of machine learning is appropriately used.

The identifier acquired as a result of learning identifies whether or not detecting of a leak is possible, according to a signal-to-noise ratio of a cross-correlation function acquired by measuring vibration acquired by vibrating piping and a measurement time for a leak in the piping. In other words, the identifier identifies whether detecting of a leak is possible in a designated measurement time in piping from which a signal-to-noise ratio of a cross-correlation function is acquired.

Figure 16:
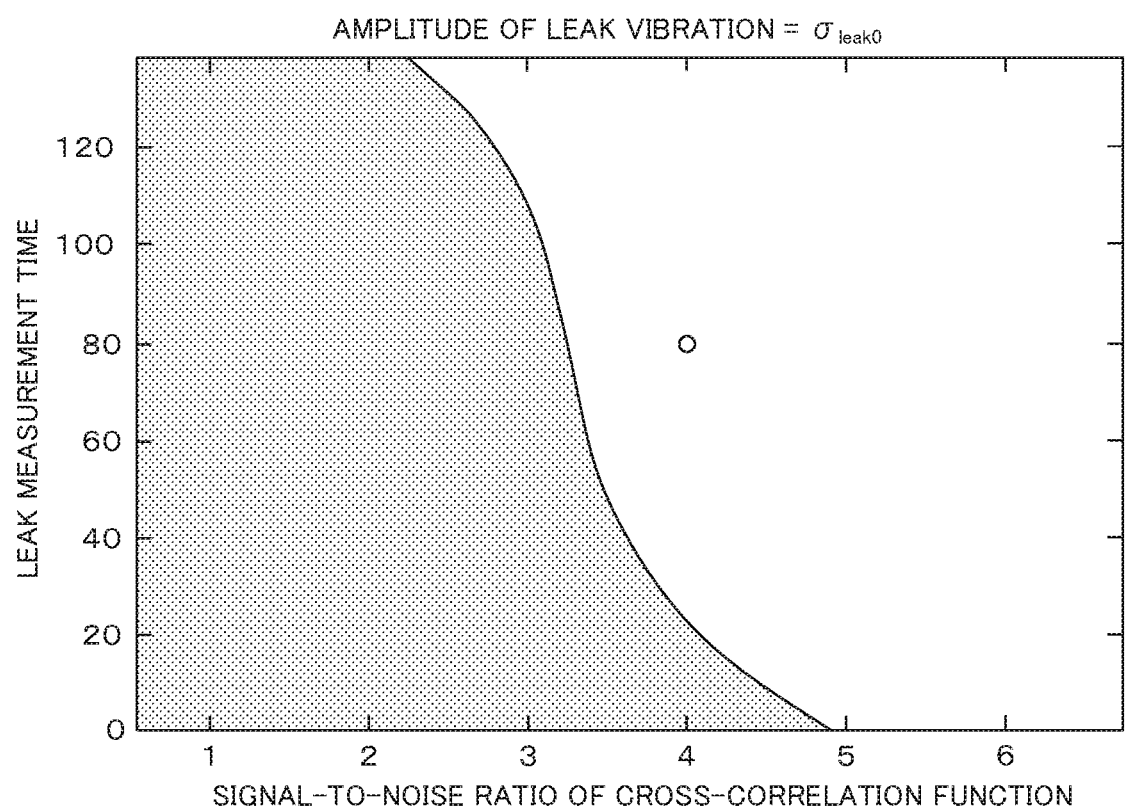
FIG. 16 is a diagram illustrating an example when an identifier identifies whether a detection on a leak is possible.

FIG. 16 illustrates an example in which an identifier generated by the determination unit 320 performs determination. It is assumed in the example in FIG. 16 that the identifier is acquired by learning, for example a relationship plotted in FIG. 15, and the like.

In the example illustrated in FIG. 16, when a relationship between a signal-to-noise ratio of a cross-correlation function and a measurement time is included in a gray region on the left side, the identifier identifies that detecting of a leak in the measurement time is impossible. Further, in this example, when a relationship between a signal-to-noise ratio of a cross-correlation function and a measurement time is included in a white region on the right side, the identifier identifies that detecting of a leak in the measurement time is possible.

In the example illustrated in FIG. 16, one white circular dot is plotted. This dot is included in the white region described above. Therefore, the identifier determines that detecting of a leak is possible in a measurement time corresponding to the white circular dot. In other words, in piping in which a signal-to-noise ratio of a cross-correlation function acquired by measuring vibration acquired by vibrating the piping corresponds to a white dot, leak vibration having magnitude of leak vibration of $\sigma_{leak}$ is sensed by a measurement for a measurement time corresponding to the white dot.

Note that FIG. 15 illustrates a relationship when the magnitude of the leak vibration is $\sigma_{leak}$. In other words, the relationship as illustrated in FIG. 15 is acquired for each magnitude of the leak vibration. In this case, a boundary between a region where it is detected as absence of a leak and a region where it is detected as presence of a leak may be treated as a boundary surface.

Figure 17:
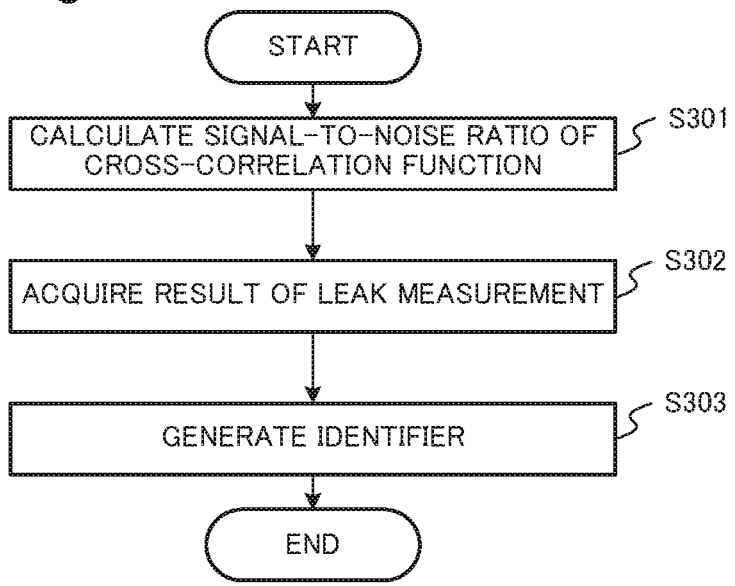
FIG. 17 is a flowchart illustrating an operation of the measurement time determination device in the second example embodiment of the present invention.

Next, one example of an operation of the measurement time determination device 300 in the third example embodiment of the present invention is described with reference to a flowchart illustrated in FIG. 17.

First, the degree-of-ease calculation unit 310 acquires a signal-to-noise ratio of a cross-correlation function, based on a measurement result of vibration acquired by measuring vibration generated by vibrating piping (Step S301). Note that the operation in Step S301 is appropriately repeated according to the number of pieces of piping being a target, and the like.

Next, the determination unit 320 acquires a result of a leak measurement corresponding to the piping from which the signal-to-noise ratio of the cross-correlation function is acquired (Step S302).

Next, the determination unit 320 generates an identifier by learning and the like, based on the signal-to-noise ratio of the cross-correlation function acquired in Step S301 and the result of the leak measurement acquired in Step S301 (Step S303).

When the identifier is generated by the determination unit 320, the identifier acquires a measurement time necessary for detecting a leak, according to the cross-correlation function of the piping being a target for leak detecting.

When the measurement time is acquired, the leak detection unit 130 of the detection device 201 appropriately detects presence or absence of a leak. In this case, the leak detection unit 130 detects presence or absence of a leak by using a result acquired from a measurement for the measurement time acquired by the identifier or a longer time than or equal to the measurement time acquired by the measurement unit 11. The measurement time is determined in such a way, and thus occurrence of false negative can be suppressed in regard to leak vibration having magnitude of the vibration greater than or equal to $\sigma_{leak}$ described above, similarly to the example in the first or second example embodiment.

As described above, the measurement time determination device 300 in the third example embodiment of the present invention statistically determines a measurement time necessary for detecting a leak, based on a result of a leak measurement performed on a plurality of pieces of piping, and the like. As described above, a measurement time necessary for detecting a leak is acquired in a form of an identifier and the like acquired by, for example, machine learning. The acquired identifier can identify whether a detection of a leak is possible in a designated measurement time, according to a signal-to-noise ratio of a cross-correlation function being a value different for each piping.

Therefore, the measurement time determination device 300 in the present example embodiment reduces a false detection on leak detecting in piping of various kinds. Then, the detection device 101 or the detection system 10 including the measurement time determination device 100 can achieve leak detecting with less false detection in piping of various kinds.

Although the present invention has been described with reference to the example embodiments, the present invention is not limited to the above-described example embodiments. Various modifications that can be understood by those skilled in the art within the scope of the present invention can be made to the configuration and the details of the present invention. Further, the configurations in respective example embodiments can be combined with each other without departing from the scope of the present invention.

This application is based upon and claims the benefit of priority from Japanese patent application No. 2017-039109, filed on Mar. 2, 2017, the disclosure of which is incorporated herein in its entirety by reference.

REFERENCE SIGNS LIST

10 Detection system
11 Measurement unit
12 Vibration unit
100 Measurement time determination device
101 Detection device
110 Degree-of-ease calculation unit
120 Determination unit
130 Leak detection unit
1101 Sensor
1102 Transmission unit
1201 Vibration mechanism
1202 Vibration condition storage unit

What is claimed is:

1. A measurement time determination device, comprising:
an input interface configured to receive vibration measurement results transmitted from a plurality of vibration sensors attached to piping;
a degree-of-ease calculation-unit configured to calculate degree-of-ease of detecting a leak in the piping, based on the received vibration measurement results of vibration propagating through the piping or a fluid flowing through the piping when the piping is vibrated, the degree-of ease representing a signal-to-noise ratio, the signal being a leak vibration to be sensed, the noise being generated due to a cause other than the leak vibration;
a determination-unit configured to determine a plurality of measurement times necessary for detecting the leak, based on the degree-of-ease, the measurement times being determined for each of a plurality of the leak vibrations having a different magnitude; and
a leak detection unit configured to detect a position in the piping of the leak based on the plurality of measurement times determined by the determination-unit.

2. The measurement time determination device according to claim 1, wherein
the degree-of-ease calculation unit calculates an attenuation characteristic of the vibration in the piping as part of the degree-of-ease.

3. The measurement time determination device according to claim 1, wherein
the degree-of-ease calculation unit further calculates the degree-of-ease, based on information related to an element of the piping, and
the determination unit further determines the measurement times, based on the information related to the element of the piping.

4. The measurement time determination device according to claim 3, wherein the information related to the element of the piping is information related to attenuation of the vibration propagating through the piping or the fluid according to the element.

5. The measurement time determination device according to claim 1, wherein the degree-of-ease calculation-unit calculates the signal-to-noise ratio of a cross-correlation function as the degree-of-ease for each of a plurality of pieces of the piping, and the determination unit further determines the measurement times, based on a relationship between the signal-to-noise ratio of the cross-correlation function related to each of the plurality of pieces of the piping and a result of measuring the leak on each of the plurality of pieces of the piping.

6. The measurement time determination device according to claim 5, wherein the determination-unit further determines the measurement times with respect to the signal-to-noise ratio by generating an identifier that learns a relationship between the signal-to-noise ratio of the cross-correlation function for each of the plurality of pieces of the piping and whether or not measuring the leak is possible in the measurement time in the piping.

7. A measurement time determination method, comprising:

receiving vibration measurement results transmitted from a plurality of vibration sensors attached to piping;

calculating degree-of-ease of detecting a leak in the piping, based on the received vibration measurement results of vibration propagating through the piping or a fluid flowing through the piping when the piping is vibrated, the degree-of ease representing a signal-to-noise ratio, the signal being leak vibration to be sensed, the noise being generated due to a cause other than the leak vibration;

determining a plurality of measurement times necessary for detecting the leak, based on the degree-of-ease, the measurement times being determined for each of a plurality of the leak vibrations having a different magnitude; and detecting a position in the piping of the leak based on the determined plurality of measurement times.

8. A non-transitory computer-readable recording medium that stores a program causing a computer to execute:

processing of receiving vibration measurement results transmitted from a plurality of vibration sensors attached to piping;

processing of calculating degree-of-ease of detecting a leak in the piping, based on the received vibration measurement results of vibration propagating through the piping or a fluid flowing through the piping when the piping is vibrated, the degree-of ease representing a signal-to-noise ratio, the signal being leak vibration to be sensed, the noise being generated due to a cause other than the leak vibration;

processing of determining a plurality of measurement times necessary for detecting the leak, based on the degree-of-ease, the measurement times being determined for each of a plurality of the leak vibrations having a different magnitude; and processing of detecting a position in the piping of the leak based on the determined plurality of measurement times.

* * * * *